US008858776B2

(12) United States Patent
Li et al.

(10) Patent No.: US 8,858,776 B2
(45) Date of Patent: Oct. 14, 2014

(54) PREPARATION OF GRAPHENE SHEETS

(75) Inventors: Lain-Jong Li, HicnChu (TW); Ching-Yuan Su, Taiping (TW)

(73) Assignee: Academia Sinica, Taipei (TW)

( * ) Notice: Subject to any disclaimer, the term of this patent is extended or adjusted under 35 U.S.C. 154(b) by 306 days.

(21) Appl. No.: 13/170,624

(22) Filed: Jun. 28, 2011

(65) Prior Publication Data

US 2013/0001089 A1    Jan. 3, 2013

(51) Int. Cl.
C25B 1/00 (2006.01)
B82Y 40/00 (2011.01)
B82Y 30/00 (2011.01)
C01B 31/04 (2006.01)

(52) U.S. Cl.
CPC ............ *B82Y 30/00* (2013.01); *C01B 2204/32* (2013.01); *C25B 1/00* (2013.01); *C01B 31/0469* (2013.01); *B82Y 40/00* (2013.01); *Y10S 977/845* (2013.01)
USPC ............ 205/341; 205/615; 205/768; 977/845

(58) Field of Classification Search
USPC ......... 205/106, 316, 341, 615, 768, 109, 111; 977/845
See application file for complete search history.

(56) References Cited

U.S. PATENT DOCUMENTS

| | | | | |
|---|---|---|---|---|
| 3,323,869 | A * | 6/1967 | Olstowski ...................... | 205/768 |
| 2003/0217928 | A1* | 11/2003 | Lin et al. ......................... | 205/109 |
| 2004/0253174 | A1* | 12/2004 | Williams ....................... | 423/608 |
| 2011/0220511 | A1* | 9/2011 | Dadvand et al. .............. | 205/238 |
| 2012/0055860 | A1* | 3/2012 | Wyndham ................... | 210/198.3 |
| 2012/0255860 | A1* | 10/2012 | Briman et al. ........... | 204/403.15 |
| 2013/0102084 | A1* | 4/2013 | Loh et al. ................. | 204/157.43 |

FOREIGN PATENT DOCUMENTS

WO    WO 2011162727 A1 * 12/2011

OTHER PUBLICATIONS

Wang, G., Wang, B., Park, J., Wang, Y., Sun, B., Yao, J. "Highly efficient and large-scale synthesis of graphene by electrolytic exfoliation." Carbon. Jul. 19, 2009. vol. 47, Issue 14. pp. 3242-3246.*
Lee, SH., Seo, SD., Jin, YH., Shim, HW., Kim, DW. "A graphite foil electrode covered with electrochemically exfoliated graphene nanosheets." Electrochemistry Communications. Aug. 4, 2010. vol. 12, Issue 10. pp. 1419-1422.*
Minerals Zone. "Graphite." Jan. 7, 2010 capture of <http://www.mineralszone.com/minerals/graphite.html> using Internet Archive Wayback Machine.*

(Continued)

*Primary Examiner* — Keith Hendricks
*Assistant Examiner* — Steven A. Friday
(74) *Attorney, Agent, or Firm* — Cesari and McKenna, LLP (57) ABSTRACT

A method of preparing graphene sheets. The method includes: immersing a portion of a first electrode and a portion of a second electrode in a solution containing an acid, an anionic surfactant, a salt, an oxidizing agent, or any combination thereof as an electrolyte, the immersed portion of the first electrode including a first carbon material and the immersed portion of the second electrode including a second carbon material or a metal; causing a potential to exist between the first and second electrodes; and recovering, from the solution, graphene sheets exfoliated from the carbon material(s). Also disclosed is a method of preparing a graphene film electrode. The method includes: dissolving graphene sheets in an organic solvent to form a solution, applying the solution on a substrate, adding deionized water to the solution on the substrate so that a graphene film is formed, and drying the graphene film.

14 Claims, 5 Drawing Sheets

(56) References Cited

OTHER PUBLICATIONS

Sridhar, V., Oh, IK. "A coagulation technique for purification of graphene sheets with graphene-reinforced PVA hydrogel as byproduct." Journal of Colloid and Interface Science. Apr. 24, 2010. vol. 348, Issue 2. pp. 384-387.*

Ma, R.Z., Liang, J., Wei, B.Q., Zhang, B., Xu, C.L., Wu, D.H. "Study of electrochemical capacitors utilizing carbon nanotube electrodes." Nov. 1999. vol. 84, Issue 1. pp. 126-129.*

Lu et al. "One-Pot Synthesis of Fluorescent Carbon Nanoribbions, Nanoparticles, and Graphene by the Exfoliation of Graphite in Ionic Liquids"; ACS Nano; vol. 3(8):2367-2375 (2009).

Su et al. "High-Quality Thin Graphene Films from Fast Electrochemical Exfoliation"; ACS Nano; vol. 5(3):2332-2339 (2011).

Liu et al. "One-Step Ionic-Liquid-Assisted Electrochemical Synthesis of Ionic-Liquid-Functionalized Graphene Sheets Directly from Graphite"; Adv. Funct. Mater. 18:1518-1525 (2008).

Schniepp et al. "Functionalized Single Graphene Sheets Derived from Splitting Graphite Oxide"; American Chemical Society; vol. 110:8535-8539 (2006).

Zhao et al. "Preparation of Graphene by Exfoliation of Graphite Using Wet Ball Milling"; J. Mater. Chem. vol. 20:5817-5819 (2010).

Guo et al. "A Green Approach to the Synthesis of Graphene Nanosheets" ACS Nano; vol. 3(9):2653-2659 (2009).

* cited by examiner

PREPARATION OF GRAPHENE SHEETS

BACKGROUND

Graphene, an atom-thick graphite, is two-dimensional sheet that possesses unique physical properties, such as optically transparent, superior thermal conductivity, excellent mechanical strength and elasticity, and high intrinsic electron mobility.

Methods for preparing graphene sheets, among others, include epitaxy and mechanical exfoliation. While these two methods produce high-quality graphene sheets, they are not suitable for large-scale production. Other methods (e.g., chemical vapor deposition, chemical exfoliation, liquid-phase exfoliation, and volatile-agent intercalation) are suitable for mass production. However, they either are expensive or produce graphene sheets having small sizes or low electric conductivities.

There is a need to develop a cost-effective method for mass production of high-quality graphene sheets.

SUMMARY OF THE INVENTION

This invention is based on an unexpected discovery that a cost-effective electrochemical exfoliation of a carbon material produces high-quality graphene sheets on a large scale.

One aspect of this invention features a method of preparing graphene sheets. The method includes (i) immersing, in a solution containing an electrolyte, a portion of a first electrode and a portion of a second electrode, the immersed portion of the first electrode including a first carbon material and the immersed portion of the second electrode including a second carbon material or a metal; (ii) causing a potential to exist between the first and second electrodes; and (iii) recovering, from the solution, graphene sheets exfoliated from the carbon material(s). The solution is preferably an aqueous solution. The electrolyte is an acid, an anionic surfactant, a salt, an oxidizing agent, or any combination thereof. In other words, the "electrolyte" referred to above can be a combination of two or more electrolytes.

Examples of an acid used as an electrolyte include $H_2SO_4$, $H_2Cr_2O_7$, $HMnO_4$, HBr, $HNO_3$, HCl, $HClO_3$, $HClO_4$, $H_1$, $H_3PO_4$, p-toluenesulfonic acid, triflic acid, carborane superacid, fluoroantimonic acid, acetic acid, citric acid, boric acid, and diethyl barbituric acid. Examples of an anionic surfactant used as an electrolyte include alkylsulfonates sodium alkane sulfonate, sodium benzenesulfonate, sodium dodecylbenzenesulfonate, ammonium lauryl sulfate, potassium lauryl sulfate, sodium myreth sulfate, sodium dodecyl sulfate, sodium laureth sulfate, sodium pareth sulfate, dioctyl sodium sulfosuccinate, perfluorobutanesulfonic acid, perfluorooctanesulfonic acid, perfluorononanoic acid, perfluorooctanoic acid, sodium palmate, sodium stearate, and sodium tallowate. A salt as an electrolyte can be a buffer salt or a non-buffer salt. Examples of the buffer salt include $Na_2HPO_4$, $KH_2PO_4$, sodium acetate, sodium citrate, borax, and any combination thereof. Examples of an oxidizing agent as an electrolyte include $KMnO_4$ and $K_2Cr_2O_7$.

The solution used in the method can further contain another electrolyte, such as a base. Examples of a base as an additional electrolyte includes KOH, $Ba(OH)_2$, CsOH, NaOH, $Sr(OH)_2$, $Ca(OH)_2$, $Mg(OH)_2$, LiOH, RbOH, n-butyl lithium (n-BuLi), lithium diisopropylamide (LDA), lithium diethylamide (LDEA), $NaNH_2$, NaH, and lithium bis(trimethylsilyl)amide $(((CH_3)_3Si)_2NLi)$. Thus, a solution containing $H_2SO_4$ can further include KOH.

Both the first and second electrodes used in the method can be each a carbon material. Alternatively, the first and second electrodes used in the method are a carbon material and a metal, respectively. The term "carbon material" refers to a graphite-containing material or a material other than graphite, e.g., amorphous carbon. The carbon material can be a nano-carbon material or a carbon bulk material. Examples of the nano-carbon material include carbon nanofibers and carbon nanotubes. Examples of the carbon bulk material include natural graphite flakes (NGF), artificial graphite, highly oriented pyrolytic graphite (HOPG), polyacrylonitrile fiber-based graphite, pitch-based graphite, carbon rod, and amorphous carbon. Examples of the metal include Pt, Ag, Au, Al, Pd, Mo, Rh, Ir, Ti, Ta, Zn, In, Sb, Te, Zr, Pb, and W.

The potential existing between the first and second electrodes can have a first bias voltage in a first time span and a second bias voltage in a second time span. The first bias voltage is preferably 0.1-250 V (e.g., 0.5-10 V and 1-6 V). The first time span is preferably 0-3,000 s (e.g., 60-2,000 s and 120-1,800 s). The second voltage is preferably 0.1-250 V (e.g., 1-15 V and 3-10 V). The second time span is preferably 1 second to 1 week (e.g., 30-900 s, 60-600 s).

Alternatively, the potential existing between the first and second electrodes has a bias voltage in a first time span and alternating voltages in a second time span. The bias voltage is preferably 0.1-250 V (e.g., 0.5-10 V and 1-2.5 V). The first time span is preferably 0-3,000 s (e.g., 30-1,000 s and 60-300 s). The alternating voltages are in a waveform preferably having an amplitude value of 0.1-250 V (e.g., 2-20 V and 5-15 V) and a period of 1-90 s (e.g., 2-30 s and 5-10 s). The second time span is preferably 1 second to 1 week (e.g., 0.5-6 hours and 1-3 hours).

The recovering step of the method includes two substeps: (a) collecting the graphene sheets on a filter, and (b) washing the graphene sheets on the filter.

The method, after the recovering step, can further includes four more steps: (i) drying the graphene sheets; (ii) redispersing the graphene sheets in an organic solvent to form a suspension; (iii) centrifuging at a pre-determined speed the suspension to obtain a supernatant containing the graphene sheets, and (iv) collecting the graphene sheets on a filter or by a reducing pressure concentration method, e.g., by removing the organic solvent under vacuum. If necessary, the method, after the colleting step, can further include one more step: heating the collected graphene sheets to remove any residual solvent.

Examples of the organic solvent includes N-methyl-2-pyrrolidinone (NMP), 1,2-dimethoxyethane (glyme, DME), dimethyl-formamide (DMF), dimethyl sulfoxide (DMSO), hexamethylphosphoramide (HMPA), hexamethylphosphorous triamide (HMPT), methyl t-butyl ether (MTBE), methylene chloride, 1,2-dichloroethane, chlorobenzene, chloroform, benzene, tetrahydrofuran (THF), petroleum ether (ligroine), nitromethane, pentane, dioxane, ethanol, ethyl acetate, ethylene glycol, heptanes, carbon tetrachloride, 1-butanol, 2-butanol, 2-butanone, acetonitrile, acetone, acetic acid, o-xylene, m-xylene, and p-xylene.

Another aspect of this invention relates to a method of preparing a graphene film electrode. The method includes (i) dissolving graphene sheets in an organic solvent to form a solution, (ii) applying the solution on a substrate, (iii) adding deionized water to the solution on the substrate so that a graphene film is formed, and (iv) drying the graphene film. Examples of an organic solvent include dimethyl-formamide (DMF) and N-methyl-2-pyrrolidinone (NMP). The concentration of the solution having DMF as an organic solvent is preferably 0.002-0.9 mg/mL (e.g., 0.01-0.5 mg/mL and 0.05-

0.25 mg/mL). The concentration of the solution having NMP as an organic solvent is preferably 0.002-0.9 mg/mL (e.g., 0.02-0.5 mg/mL and 0.05-0.3 mg/mL).

The method, after the drying step, can further include heating the graphene film to remove the residual organic solvent and water. To improve conductivity of the graphene film, the method, after the heating step, can further include dipping it in a solution containing an acid or a conducting polymer. The temperature for this dipping step is preferably 25-150° C. (e.g., 40-120° C. and 60-100° C.). Examples of an acid include $H_2SO_4$, $HNO_3$, and $SOCl_2$. The concentration of $H_2SO_4$ is preferably 0.1-12 M (e.g., 0.2-9 M and 0.5-5 M). The concentration of $HNO_3$ is preferably 20-80 wt % (e.g., 40-75 wt % and 55-65 wt %). The concentration of $SOCl_2$ is preferably 40-99 wt % (e.g., 70-98 wt % and 95-97 wt %). The acid-containing solution is preferably an aqueous solution. The conducting polymer can be TCNQ (7,7,8,8-tetracyanoquinodimethane), PEDOT:PSS [Poly(3,4-ethylenedioxythiophene) poly(styrenesulfonate)], or F4-TCNQ (tetrafluoro-tetracyanoquinodimethane). The concentration of the conducting polymer in an organic solvent is preferably 0.01-10 mg/mL (e.g., 0.5-5 mg/mL and 3.5-4.5 mg/mL). The organic solvent can be dimethyl sulfoxide (DMSO). For example, the concentration of TCNQ in DMSO is 4.0 mg/mL.

To further improve conductivity of the graphene film, the method, after the dipping step, can further include thermally annealing it in a mixture of $H_2$ and Ar. The ratio of $H_2$ to Ar is preferably 1/1 to 1/20 (e.g., 1/2 to 1/10 and 1/3 to 1/5). The pressure is preferably 0.5-700 Torr (e.g., 10-600 Torr and 100-500 Torr). The temperature for thermal annealing is preferably 150-900° C. (e.g., 250-700° C. and 350-550° C.).

Several advantages of the claimed electrochemical method include, but not limited to, fast, easy to be scaled up, high yield, high quality, and low cost.

The claimed electrochemical method preserves the intrinsic graphene structure. The graphene sheets produced by this method are readily dissolved in dimethyl formamide (DMF). They, upon in contact with water as an antisolvent, can self-aggregate at the air-DMF interface due to their strong surface hydrophobicity. A continuous thin film obtained from these graphene sheets exhibits an ultra-transparency with a ~96% transmittance rate and a resistance of <1 kΩ/sq (which denotes 1 kilo-ohms per square) after a simple $HNO_3$ treatment, both of which are superior to those of a film obtained from graphene sheets produced by chemical exfoliation or other exfoliation methods. Such a low-resistance and high-transparency characteristics likely make these thin-films promising for replacing currently used high-cost indium tin oxide electrodes in the future.

The details of one or more embodiments are set forth in the accompanying description below. Other aspects, features, and advantages will be apparent from the following drawings and detailed description of embodiments, and also from the appending claims.

DETAILED DESCRIPTION

This invention relates to a method of producing graphene sheets.

The method includes 3 steps: (i) immersing a first electrode and a second electrode in a solution containing an electrolyte, (ii) causing a potential to exist between the two electrodes; and (iii) recovering, from the solution, graphene sheets exfoliated from one or both electrodes, which include a carbon material, the term "electrode" refers to an electrical conductor used to make contact with a solution containing an electrolyte, the term "anode" refers to an electrode at which electrons leave the cell and oxidation occurs, and the term "cathode" refers to an electrode at which electrons enter the cell and reduction occurs.

In one embodiment, a carbon material is employed as the first electrode (see the left panel of FIG. 1b) and a source of graphene sheets for electrochemical exfoliation; and a metal wire is employed as the second electrode. Into a solution containing the above-mentioned electrolyte, the first electrode is inserted as an anode and the second electrode is inserted as a cathode, as shown FIG. 1a. The potential is a low bias voltage applied to these two electrodes to wet the carbon material and cause gentle intercalation of an anionic component of an electrolyte into the grain boundary of the carbon material. The low bias voltage is followed by a high bias voltage to dissociate the wetted carbon material into graphene sheets as shown in the right panel of FIG. 1b.

In another embodiment, the low bias voltage is followed by high alternating voltages in a waveform, i.e., multiple voltage pulses each in a square, triangular, sawtooth, or sinusoidal shape. The term "waveform" is a plot of voltage (or current) amplitude as a function of time. For example, a waveform that has an amplitude value of 10 V and a period of 10 s can be set to alternate between +10 V (for 5 s) and −10 V (for 5 s). The term "period" refers to the duration in which the voltage change in a waveform corresponds to one repetitive unit, e.g., 10 s in the just-mentioned example. In the case of voltages alternating from positive to negative, each electrode becomes either the anode or the cathode depending on the direction of current through the cell. The alternating voltages help reduce the oxidized carbon material in the first electrode.

In yet another embodiment, the second electrode is also a carbon material. A low bias voltage is followed by a high bias voltage or high alternating voltages in a waveform.

The electrochemical exfoliation in the above mentioned embodiments can be performed at a temperature of 10 to 120° C. (e.g. 15 to 60° C., or 20-30° C.).

The solution used in the method can have one electrolyte. The term "electrolyte" refers to any substance that, when dissolved in an aqueous solution, exists as free ions that are electrically conductive. The electrolyte required by this method can be an acid, an anionic surfactant, a salt (a buffer salt or a non-buffer salt), an oxidizing agent, or any combination thereof. The concentration of an electrolyte is preferably 5 mM to 2 M (e.g., 10 mM to 1 M and 0.1 to 0.5 M).

If necessary, the solution can have an addition electrolyte(s). For example, a base can also be included as an electrolyte. The concentration of the additional electrolyte is preferably 5 mM to 2 M (e.g., 10 mM to 1 M and 0.2 to 0.7 M). Note that a solution containing a strong acid and a strong base in effect contains a non-buffer salt as an electrolyte. For instance, equal equivalents of $H_2SO_4$ and KOH in a solution form $K_2SO_4$, a non-buffer salt electrolyte. As mentioned above, examples of a buffer salt include $Na_2HPO_4$, $KH_2PO_4$, sodium acetate, sodium citrate, borax, and any combination thereof.

The solution containing a buffer salt as an electrolyte preferably has a pH value of 0-14 (e.g., 0.5-7 and 1-4). The solution containing an anionic surfactant as an electrolyte preferably has a pH value of 0-14 (e.g., 0.5-13 and 1-12). The pH can be adjusted by adding an acid or a base to the solution. For instance, pH 3 to 8 can be achieved by adding citric acid to a $Na_2HPO_4$-containing solution; pH 2.6 to 12 can be achieved by adding citric acid, boric acid, or diethyl barbituric acid to a $KH_2PO_4$-containing solution; pH 3.7 to 5.6 can be achieved by adding acetic acid to a sodium acetate-containing solution; pH 1 to 5 can be achieved by adding HCl to a sodium citrate-containing solution; and pH 9.2 to 11 can be achieved by adding NaOH to a borax-containing solution.

Electrochemical exfoliation of graphene sheets with an acid as an electrolyte is very efficient. However, it generally produces thin sheets with a high defect level as the acid causes strong oxidation of the carbon material that is used as an anode. To reduce this oxidation, a base, such as KOH, can be added to the solution to lower its acidity to a pH value above 1, e.g., 1.2, 7, and 9. Alternating voltages can be applied to exfoliate the carbon material following a low bias voltage sp as to further reduce the oxidation.

Figure 1:
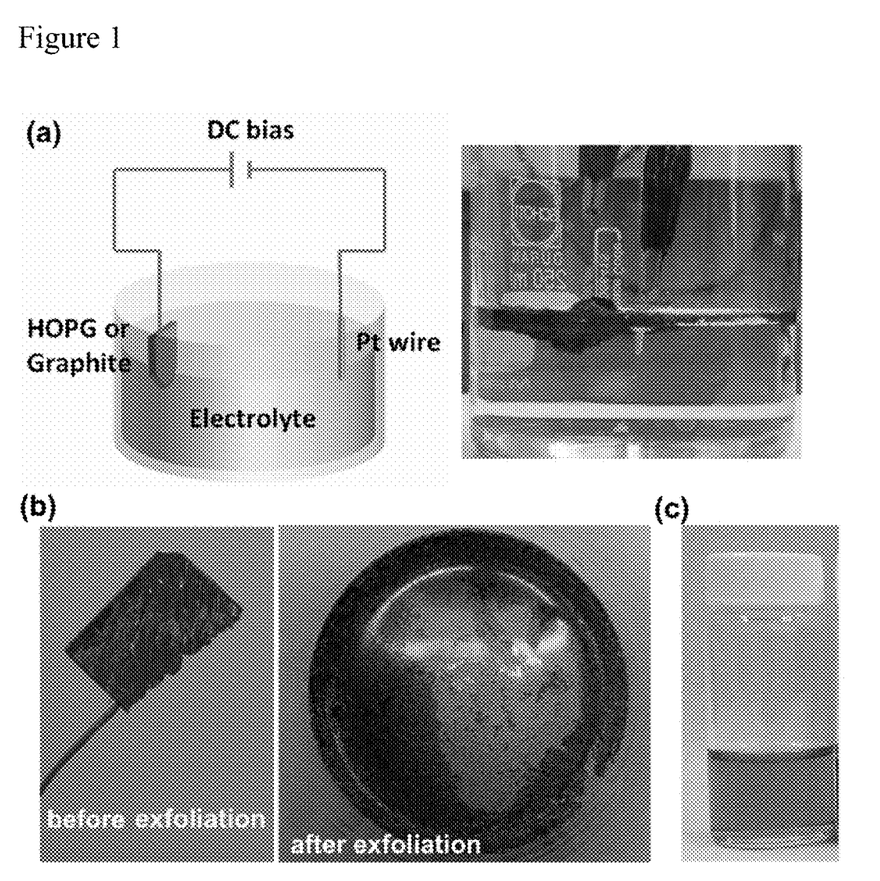
FIG. 1a is a schematic illustration and photo for electrochemical exfoliation of graphite.
FIG. 1b includes two photos of the graphite flakes before and after electrochemical exfoliation, respectively.
FIG. 1c is a photo of the dispersed graphene sheets in a DMF solution.

The graphene sheets electrochemically exfoliated into the solution can be collected on a porous filter and washed by filtration to remove the residual electrolyte(s). To further purify the washed graphene sheets, after drying, they can be dispersed in an organic solvent, such as DMF, by a gentle water-bathed sonication. FIG. 1c shows a photo of the dispersed graphene sheets in a DMF solution. To remove unwanted large graphite particles, the suspension can be centrifuged at a speed of 500-10,000 rpm (e.g., 1,000-5,000 and 2,000-3,000 rpm). The graphene sheets in the supernatant can be collected on a porous filter. If needed, the residual organic solvent can be removed by heating the collected graphene sheets.

To evaluate the quality of the exfoliated graphene sheets, one can use the various methods described in Su, et al., ACS Nano. 2011, 5(3):2332-9. Briefly, atomic force microscopy (AFM) images is performed in a Veeco Dimension-Icon system to measure the thickness of a graphene sheet. Raman spectra is collected in a NT-MDT confocal Raman microscopic system (laser wavelength 473 nm and laser spot-size is ~0.5 μm) to determine the degree of recovery of $sp^2$ C=C bonds in a graphene sheet. The Si peak at 520 $cm^{-1}$ is used as reference for wave number calibration. A scanning tunneling microscope (STM) analysis is carried out on a Veeco STM base in ambient condition to determine the carbon atomic structure of a graphene sheet. UV-vis-NIR transmittance spectra is obtained using a Dynamica PR-10 spectrophotometer to determine the transparency of a graphene sheet. XPS measurements ise carried out by an Ulvac-PHI 1600 spectrometer with monochromatic Al Kα X-ray radiation (1486.6 eV) to determine functional groups present in a graphene sheet. ATR-IR spectra is collected in Perkin-Elmer IR spectrometer to determine functional groups present in a graphene sheet. Conductivity measurements of graphene-assembled film ise carried out on a Napson RT-70 using a four-point-probe head with a pin distance of about 1 mm. Nanostructures of a graphene sheet, including its size, ise further investigated in a transmission electron microscope (TEM) JEOL-2010F with an accelerating voltage of 200 keV.

An electrochemically exfoliated graphene sheets can be used to prepare an ultra-thin transparent conducting electrode as follows. A quartz or glass substrate is first cleaned with a Piranha solution to remove undesired impurities and to make the surface hydrophilic. A graphene solution in an organic solvent is dropped onto the cleaned substrate, followed by adding a drop of deionized water. The thin graphene film is then form by self-aggregation. If the density of the organic solvent is lower than 1, the film is formed at the interface of the solvent and air. If it is higher than 1, the film is formed at the interface of the solvent and the substrate. The film is then dried in air. Subsequently, the film is heated to remove the residual DMF by evaporation. To improve conductivity, the film is dipped in an acid or a conducting polymer solution at or above room temperature. To further improve conductivity, the treated thin graphene film is thermally annealed by loading it into a quartz tube in a furnace, where a mixture gas of $H_2/Ar$ is directed into the quartz tube at hundreds degrees at a fixed pressure.

Without further elaboration, it is believed that the above description has adequately enabled the present invention. The following examples are, therefore, to be construed as merely illustrative, and not limitative of the remainder of the disclosure in any way whatsoever. The publications cited herein are hereby incorporated by reference in their entirety.

EXAMPLE 1

Electrochemical Exfoliation of Graphene Sheets in a $H_2SO_4$-Containing Solution Having a Carbon Bulk Material as a First Electrode and a Pt Wire as a Second Electrode A carbon bulk material, such as NGF (average dimensions of ~5-20 mm×5-20 mm×0.3-0.6 mm) and HOPG (1.5 cm×1.5 cm×0.3 mm), was employed as an electrode and a source of graphene sheets for electrochemical exfoliation. The carbon bulk material was attached to a tungsten wire by a silver pad and then was inserted as an anode into a solution containing $H_2SO_4$ as an electrolyte. Note that only the carbon bulk material was immersed into the acid solution. A Pt wire was placed parallel to the carbon bulk material with a separation of 5 cm. The acid solution was prepared by dissolving 4.8 g of $H_2SO_4$ (Sigma-Aldrich; 98%) in 100 mL of deionized water. The electrochemical exfoliation process was carried out by applying a voltage bias of +1 V to the electrodes for 30 min, followed by a voltage bias of +5 or +10 V for 1 min or a voltage bias of +3 V for 10 min. Alternatively, the electrochemical exfoliation process was carried out by applying a voltage bias of +6 V to the electrodes for 2 min or voltages in a waveform alternating between +5 V (for 2 s) and −5 V (for 5 s) until a desired amount of exfoliated sheets were obtained.

To harvest graphene sheets, the exfoliated graphene sheets were collected with a 100 nm porous filter and washed with deionized water by vacuum filtration. After drying, the graphene sheets were further purified as follows. The dried graphene sheets were dispersed DMF solution by gentle water-bath sonication for 5 min. The suspension was subjected to centrifugation at 2500 rpm to remove unwanted large graphite particles produced in the exfoliation. The supernatant of the centrifuged suspension was then used for further characterization and film preparation.

The above-mentioned experimental procedures were performed at room temperature (25±3° C.). These procedures each had a yield of 6-8% (wt %) and produced graphene sheets, a substantial percentage (i.e., 20-30%) of which each have dimensions of 10-40 μm in width, 10-40 μm in length, and 1.4-1.6 nm in thickness.

EXAMPLE 2

Electrochemical Exfoliation of Graphene Sheets in a $H_2SO_4$-Containing Solution Having Carbon Bulk Materials as a First Electrode and a Second Electrode Both electrodes employed carbon bulk materials, such as artificial graphite (2.0 cm×2.0 cm×3 mm) and HOPG (1.5 cm×1.5 cm×0.3 mm), as sources of graphene sheets for electrochemical exfoliation. The carbon bulk materials were each attached to a tungsten wire by a silver pad and then were inserted as an anode and a cathode into a solution containing $H_2SO_4$ as an electrolyte. As noted above, only the carbon bulk materials immersed into the acid solution. The acid solution was prepared by dissolving 4.8 g of $H_2SO_4$ in 100 mL of deionized water. The electrochemical exfoliation process was carried out by applying a voltage bias of +1 V to the electrodes for 30 min, followed by a voltage bias of +10 V for 1 min.

The electrochemical exfoliated graphene sheets can be collected and purified as described in Example 1 above.

This procedure had a yield of about 18% (wt %) and produced graphene sheets, a substantial percentage (i.e., 20-30%) of which each have dimensions of 10-40 μm in width, 10-40 μm in length, and 1.4-1.6 nm in thickness.

EXAMPLE 3

Electrochemical Exfoliation of Graphene Sheets in a $H_2SO_4$-Containing Solution Having a Nano-Carbon Material as a First Electrode and a Pt Wire as a Second Electrode A nano-carbon material, such as a carbon material (2.0 cm×2.0 cm×3 mm) containing nanotubes each of 0.7-100 nm×2 nm-200 μm×0.8-1.6 nm, was employed as an electrode and a source of graphene sheets for electrochemical exfoliation. The nano-carbon material was attached to a tungsten wire by a silver pad and then was inserted as an anode into a solution containing $H_2SO_4$ as an electrolyte. Only the nano-carbon material was immersed into the acid solution. A Pt wire was placed parallel to the nano-carbon material with a separation of 5 cm. The acid solution was prepared by dissolving 4.8 g of $H_2SO_4$ in 100 mL of deionized water. The electrochemical exfoliation process was carried out by applying a voltage bias of +1 V to the electrodes for 30 min, followed by a voltage bias of +10 V for 1 min.

The electrochemical exfoliated graphene sheets can be collected and purified as described in Example 1 above.

This procedure had a yield of about 2% (wt %) and produced graphene sheets in nano-ribbon shape, a substantial percentage (i.e., 30%) of which each have dimensions of about 10 nm-100 nm in width, 2 nm-200 μm in length, and 0.8-1.6 nm in thickness.

EXAMPLE 4

Electrochemical Exfoliation of Graphene Sheets in a $H_2SO_4$-Containing Solution Having Nano-Carbon Materials as a First Electrode and a Second Electrode Both electrodes employed nano-carbon materials, such as a carbon material (2.0 cm×2.0 cm×3 mm) containing nanofibers each of 2 nm-20 μm×2 nm-200 μm×2 nm, as sources of graphene sheets for electrochemical exfoliation. The nano-carbon materials were each attached to a tungsten wire by a silver pad and then were inserted as an anode and a cathode into a solution containing $H_2SO_4$ as an electrolyte. Only the nano-carbon materials were immersed into the acid solution. The acid solution was prepared by dissolving 4.8 g of $H_2SO_4$ in 100 mL of deionized water. The electrochemical exfoliation process was carried out by applying a voltage bias of +1 V to the electrodes for 30 min, followed by a voltage bias of +10 V for 1 min.

The electrochemical exfoliated graphene sheets can be collected and purified as described in Example 1 above.

This procedure had a yield of about 2-5% (wt %) and produced graphene sheets, a substantial percentage (i.e., 30%) of which each have dimensions of about 2 nm-20 μm in width, 2 nm-200 μm in length, and 0.8-2 nm in thickness.

EXAMPLE 5

Electrochemical Exfoliation of Graphene Sheets in a Sodium Benzenesulfonate-Containing Solution Having a Carbon Bulk Material as a First Electrode and a Pt Wire as a Second Electrode A carbon bulk material, such as HOPG (1.5 cm×1.5 cm×0.3 mm), was employed as an electrode and a source of graphene sheets for electrochemical exfoliation. The carbon bulk material was attached to a tungsten wire by a silver pad and then was inserted as an anode into a solution of pH 1 containing benzenesulfonic acid (i.e., an anionic surfactant) as an electrolyte. Only the carbon bulk material was immersed into the anionic surfactant solution. A Pt wire was placed parallel to the carbon bulk material with a separation of 5 cm. The surfactant solution was prepared by dissolving 10 g of 90% benzensulfonic acid in 100 mL of deionized water. The electrochemical exfoliation process was carried out by applying a voltage bias of +1 V to the electrodes for 30 min, followed by a voltage bias of +10 V for 1 min.

These electrochemical exfoliated graphene sheets can be collected and purified as described in Example 1 above.

This procedure had a yield of 8-12% (wt %) and produced graphene sheets, a substantial percentage (i.e., 20-30%) of which each have dimensions of 10-40 μm in width, 10-40 μm in length, and 1.4-1.6 nm in thickness.

EXAMPLE 6

Electrochemical Exfoliation of Graphene Sheets in a $H_2SO_4$/KOH-Containing Solution Having a Carbon Bulk Material as a First Electrode and a Pt Wire as a Second Electrode A carbon bulk material, such as NGF (5-20 mm×5-20 mm×0.3-0.6 mm) and HOPG (1.5 cm×1.5 cm×0.3 mm), was employed as an electrode and a source of graphene sheets for electrochemical exfoliation. The carbon bulk material was attached to a tungsten wire by a silver pad and then was inserted as an anode into a solution of pH 1.2, pH 7.19, or pH 8.96 containing $H_2SO_4$/KOH as electrolytes. Only the carbon bulk material immersed into the solution. The solution was prepared by dissolving 2.4 g of $H_2SO_4$ in 100 mL of deionized water and adding a 30% KOH solution to reach a pH value of 1.2, 7.19, or 8.96. The electrochemical exfoliation process was carried out by applying a voltage bias of +2.5 V to the electrodes for 1 min, followed by a voltage waveform alternating between +10 V (for 2 s) and −10 V (for 5 s) until one obtained a desired amount of exfoliated sheets.

These electrochemical exfoliated graphene sheets can be collected and purified as described in Example 1 above.

This procedure had a yield of 5-8% (wt %) and produced graphene sheets, a substantial percentage (i.e., 20-30%) of which each have dimensions of about 10-40 µm in width, 10-40 µm in length, and 1.4-1.6 nm in thickness.

EXAMPLE 7

Electrochemical Exfoliation of Graphene Sheets in a $H_2SO_4$/KOH-Containing Solution Having Carbon Bulk Materials as a First Electrode and a Second Electrode Both electrodes employed carbon bulk materials, such as artificial graphite (20 mm×20 mm×5 mm), NGF (1.5 mm×1.5 mm×3 mm), and HOPG (1.5 cm×1.5 cm×3 mm), as sources of graphene sheets for electrochemical exfoliation. The carbon bulk materials were each attached to a tungsten wire by a silver pad and then were inserted as an anode and a cathode into a solution of pH 1.2 containing $H_2SO_4$/KOH as an electrolyte. Only the carbon bulk materials immersed into the solution. The solution was prepared by dissolving 2.4 g of $H_2SO_4$ in 100 mL of deionized water and adding 11 mL of 30% KOH solution to reach a pH value of 1.2. The electrochemical exfoliation process was carried out by applying a voltage bias of +2.5 V to the electrodes for 1 min, followed by a voltage waveform alternating between +10 V (for 2 s) and −10 V (for 5 s) until one obtained a desired amount of exfoliated sheets.

These electrochemical exfoliated graphene sheets can be collected and purified as described in Example 1 above.

This procedure had a yield of 10-18% (wt %) and produced graphene sheets, a substantial percentage (i.e., 20-30%) of which each have dimensions of about 10-40 µm in width, 10-40 µm in length, and 1.4-1.6 nm in thickness.

EXAMPLE 8

Characterization of an Electrochemically Exfoliated Graphene Sheet Obtained from Example 6

Figure 2:
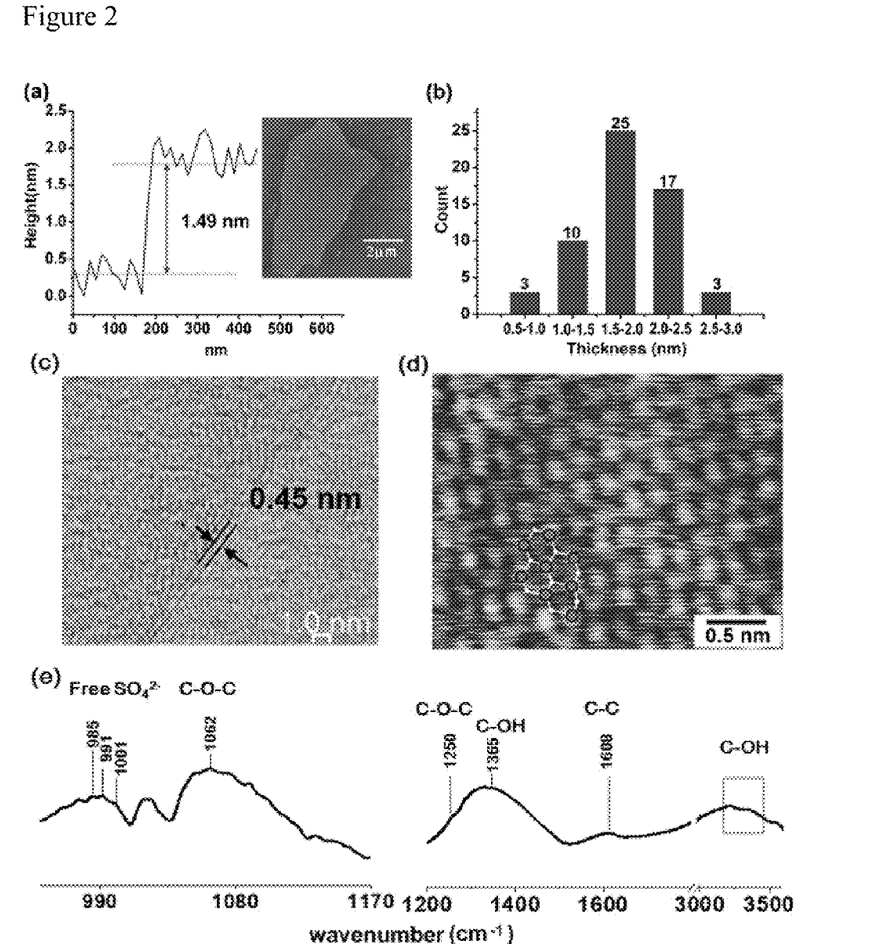
FIG. 2a is a typical AFM image for an electrochemically exfoliated graphene sheet casted on a $SiO_2$ substrate.
FIG. 2b is a statistical thickness analysis of the graphene sheet ensemble (Randomly selected 58 sheets were measured by AFM)
FIG. 2c is a typical TEM image for an electrochemically exfoliated bilayered graphene sheet.
FIG. 2d is a corresponding STM image of the bilayered graphene sheet, where hexagons indicates the atom configuration of the two layers.
FIG. 2e is a ATR-FTIR spectrum acquired from the graphene sheet ensemble.

FIG. 2a shows a typical AFM image for an electrochemically exfoliated graphene sheet drop-casted on a $SiO_2$ substrate. The thickness was determined to be 1.49 nm. A statistical thickness analysis shows that the electrochemically exfoliated graphene sheets had thicknesses lower than 3 nm and more than 65% of the sheets were thinner than 2 nm (see FIG. 2b). FIG. 2c shows a TEM image typically seen for an electrochemically exfoliated graphene sheet. It reveals that the layer number of a sheet ranged from 1 to 4 with 2 as the most frequently seen number. FIG. 2d shows a STM image from a selected area of an electrochemically exfoliated graphene sheet, where the bright lattice pattern marked with circles and spots suggests that the graphene sheet is an A-B stacked bilayer. The attenuated total reflection Fourier transform infrared (ATR-FTIR) spectrum for the graphene sheet shown in FIG. 2e proved the presence of free (non-bonded) $SO_4^{2-}$ (at 985, 995 and 1001 $cm^{-1}$), C—O—C (at 1062 and 1250 $cm^{-1}$), C—OH (at 1365 $cm^{-1}$ and a broad absorption band at 3000-3500 $cm^{-1}$). It indicates that anionic $SO_4^{2-}$, a component of the electrolyte used in Example 6, was adsorbed on the surface of an electrochemically exfoliated graphene sheet. The presence of the functional groups, e.g., C—O—C and C—OH, expanded the layer spacing in the graphene sheet, which also explains that the measured AFM thickness of the bilayered graphene sheet (1.5 nm) was slightly greater than the reported value (0.9 to 1.2 nm). See Gupta, et al., *Nano Lett.* 2006, 6, 2667-2673.

Figure 3:
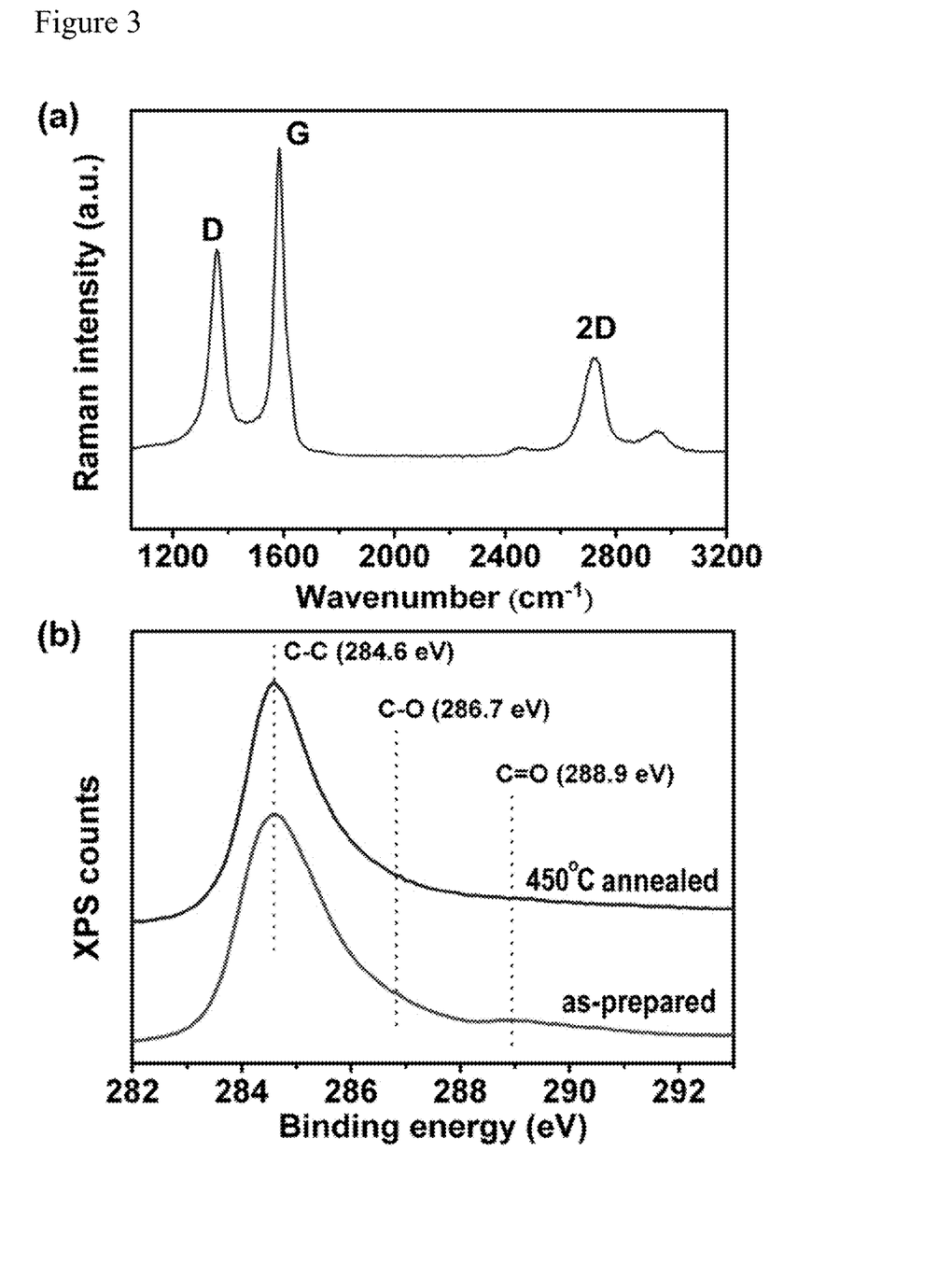
FIG. 3a is a Raman spectrum (excited by 473 nm laser) of a selected graphene sheet with the measured AFM thickness of ~1.6 nm, where D, G and 2D bands were indicated in the Figure.
FIG. 3b includes XPS characterization (C1s binding energy) of electrochemically exfoliated graphene thin sheets before and after 450° C. thermal annealing.

FIG. 3a shows a Raman spectrum (excited by 473 nm laser) for a selected graphene sheet with a thickness of ~1.6 nm as determined by AFM. It is clearly seen that the graphene sheet exhibited an intense 2D band at around 2720 $cm^{-1}$. The 2D/G for this graphene sheet was significantly higher than that produced by a chemical exfoliation method. Note that the 2D/G ratio has been shown to be related to the degree of recovery for $sp^2$ C═C bonds (graphitization) in graphitic structures. See Krauss, et al., *Phys. Rev. B.* 2009, 79, 165428-9. Therefore, the quality of the graphene sheets obtained from the electrochemical exfoliation was better than the chemical exfoliation method.

Figure 4:
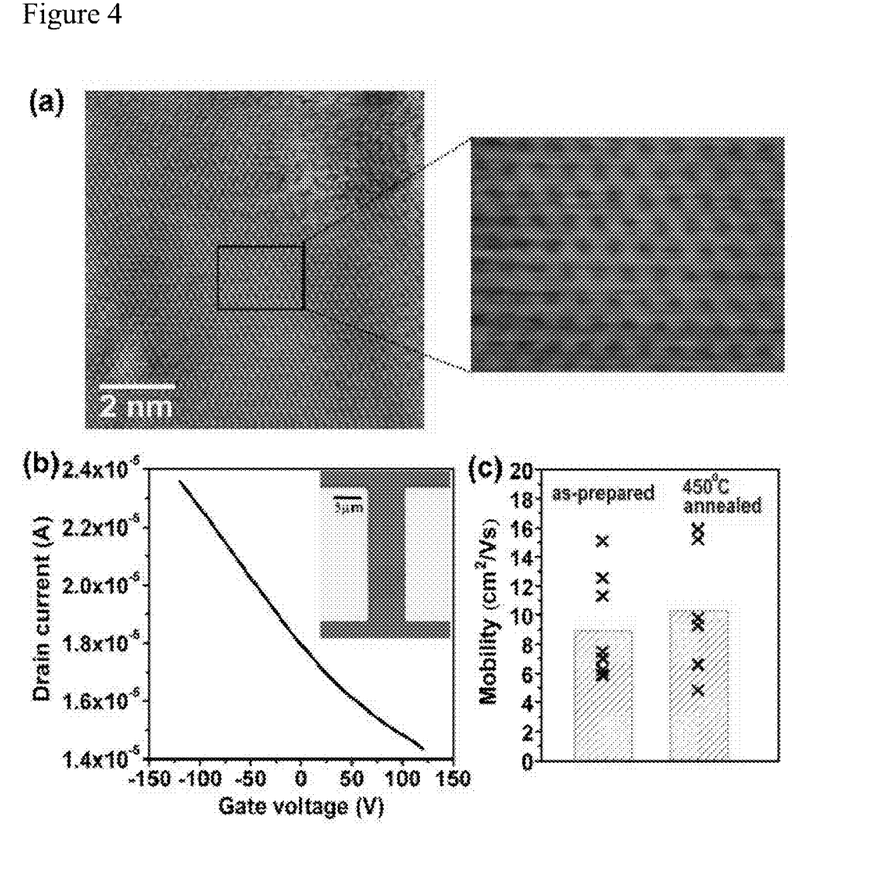
FIG. 4a is a typical STM image obtained from a thin graphene sheet (~1.5 nm thick), where the hexagonally arranged atomic carbon structure is clearly identified.
FIG. 4b is an output characteristics (drain current $I_d$ vs. drain voltage $V_d$) for a device prepared from a single graphene sheet (the inset is a photograph showing the device)
FIG. 4c includes statistical analyses of the graphene sheets (with a thickness of 1.5 to 2 nm), as-prepared and after thermal annealing. Only graphene sheets with a typical size were selected for the convenience of extracting their effective field effect mobility.

To further access the quality of the electrochemically exfoliated graphene sheets, FIG. 4a displays a typical STM image obtained from a thin graphene sheet (~1.6 nm thick based on AFM measurement), where the hexagonally arranged carbon atomic structure were readily identified even without performing the noise correction to the image, corroborating the high quality of the exfoliated graphene sheet. The fuzzy area in STM image was attributed to the surface functional groups, such as C—OH as identified in XPS and ATR-FTIR spectra, on the basal plane of the graphene sheet.

EXAMPLE 9

Fabrication of Field-Effect Transistor Device with an Electrochemically Exfoliated Graphene Sheet Obtained from Example 6

To evaluate the electrical performance of an electrochemically exfoliated graphene sheet, bottom-gated-operated transistors were fabricated by (1) depositing it onto a silicon substrate with a 300 nm silicon oxide layer using a dip-coating method, followed by baking at 190° C. to remove solvent; and evaporating Au electrodes (30 nm thick) directly on top of the graphene sheet using a copper grid (200 mesh, 20 µm spacing) as a hard mask. The typically obtained channel length between source and drain electrodes was around 20 µm. The electrical measurements were performed in ambient conditions using a Keithley semiconductor parameter analyzer, model 4200-SCS. FIG. 4b demonstrates the transfer curve (drain current $I_d$ vs. gate voltage $V_g$) for the device prepared from an as-prepared single graphene sheet. Inset shows the top view of the device. The field-effect mobility of holes was extracted based on the slope $\Delta I_d/\Delta V_g$ fitted to the linear regime of the transfer curves using the equation $\mu=(L/WC_{ox}V_d)(\Delta I_d/\Delta V_g)$, where L and W are the channel length and width, $V_d$ is the drain voltage and $C_{ox}$ is the gate capacitance. The mobility of the exfoliated graphene sheet ranged from 5.5 to 17 $cm^2/V \cdot s$ in ambient, which is at least an order of magnitude higher than the reported ~0.1-1 $cm^2/V \cdot s$ exhibited by a chemically exfoliated graphene sheet. See Luo, et al., *J. Am. Chem. Soc.* 2009, 131, 898-899; Su, et al., *Chem. Mater.* 2009, 21, 5674-5680; and Su, et al., *ACS Nano*, 2010, 4 (9), 5285-5292. Statistical analyses for the graphene sheets (with a thickness of 1.5 to 2 nm), for both as-prepared and after thermal annealing, are shown in FIG. 4c. The thermal annealing only resulted in slight improvement in mobility and hence film quality, which agreed with the conclusion drawn from XPS measurement (FIG. 3b).

EXAMPLE 10

Preparation of Thin-Film Electrodes with Electrochemically Exfoliated Graphene Sheets Obtained from Example 6

To prepare an ultra-thin transparent conducting electrode, a quartz or glass substrate was first cleaned with a Piranha solution to remove undesired impurities and to make the surface hydrophilic. A graphene solution with the concentration of 0.085 mg/mL in DMF (~500 µL) was dropped onto the cleaned substrate, followed by adding a drop (100-600 µL) of deionized water. The thin graphene film was self-aggregated at air-DMF interface. It was then dried in air. After that, the thin graphene film was heated on a hot plate at 190° C. for 30 min to remove the residual DMF by evaporation. This film was then dipped in a 69% of $HNO_3$ solution at 80° C. for 1 h. The acid-treated thin graphene film was thermally annealed by loading it into a quartz tube in a furnace, where a mixture gas of $H_2/Ar$ (20 sccm/80 sccm) was directed into the quartz tube at 450° C. for 30 min (pressure fixed at 500 Torr).

Figure 5:
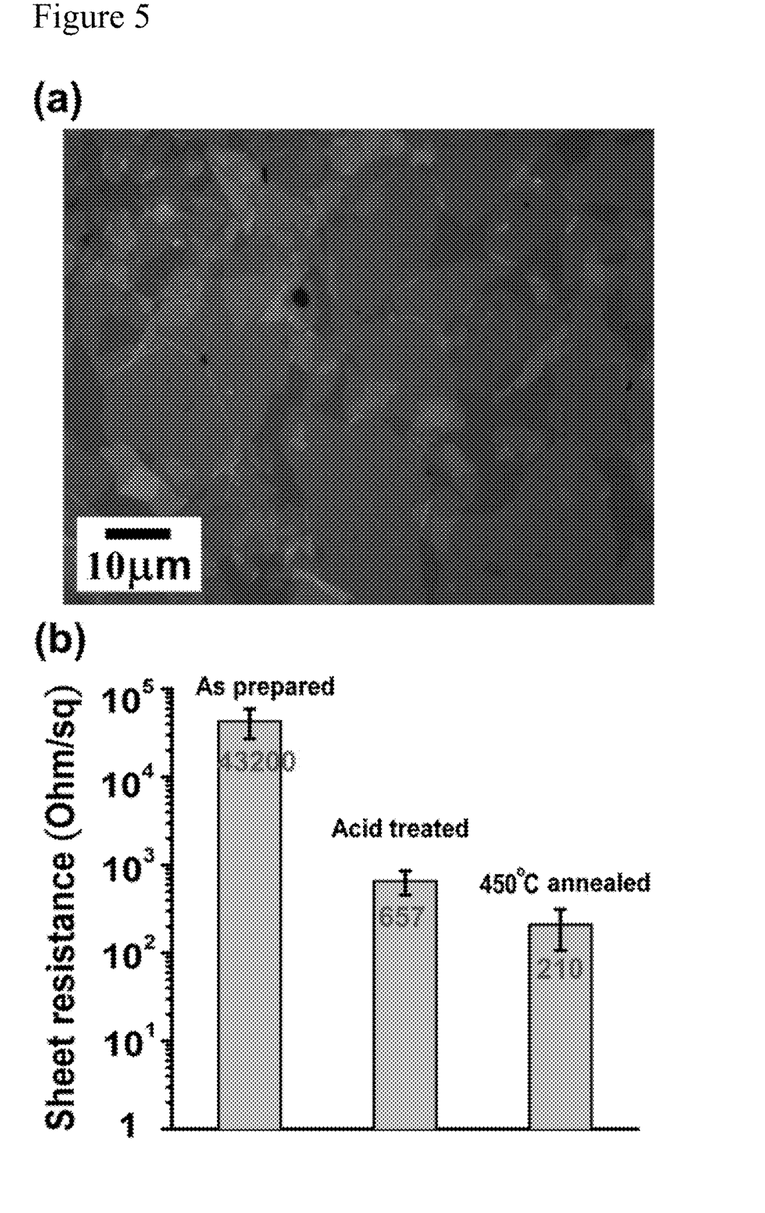
FIG. 5a is an image of a cast thin-conducting electrode on a quartz substrate.
FIG. 5b includes sheet resistance values of as-prepared thin-films (with a ~96% transmittance rate) and those after acid treatment and after thermal annealing.

FIG. 5a shows the optical microscopic image for the above-described thin-film formed on a quartz substrate. With the careful control for the film formulation process, the exfoliated thin sheets nicely aggregated to form a percolative thin-film, in which there were fewer inter-sheet junctions due to the unexpectedly large size of the electrochemically exfoliated sheets. It is therefore beneficial for electrical conduction. FIG. 5b shows the sheet resistance values for the thin-films (with a ~96% transmittance rate) measured using a 4-point probe system. The sheet resistance for the as-prepared sample was 43,200 Ω/sq and it was largely reduced to ~660 Ω/sq after a simple dipping in a 69% of $HNO_3$ solution (at 80° C. for 1 hr). This can be simply explained by the hole carrier density increase caused by neutralizing the electron-doping from the solvent DMF and also the hole doping by $HNO_3$ itself. The sheet resistance was further lowered to ~210 Ω/sq after 450° C. thermal annealing while maintaining its ultra-high transmittance. Moreover, the thin-films were transferred onto a flexible and transparent substrate by a roll-to-roll process.

OTHER EMBODIMENTS

All of the features disclosed in this specification may be combined in any combination. Each feature disclosed in this specification may be replaced by an alternative feature serving the same, equivalent, or similar purpose.

Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the scope of the following claims.

What is claimed is:

1. A method of preparing graphene sheets, the method comprising:
   immersing, in a solution containing an electrolyte, a portion of a first electrode and a portion of a second electrode, the immersed portion of the first electrode including a first graphite-containing material and the immersed portion of the second electrode including a second graphite-containing material or a metal;
   causing an alternating potential to exist between the first and second electrodes; and
   recovering, from the solution, graphene sheets exfoliated from the first and/or second graphite-containing material(s), wherein the electrolyte is an anionic surfactant selected from the group consisting of alkylsulfonate, sodium alkane sulfonate, sodium benzenesulfonate, sodium dodecylbenzenesulfonate, ammonium lauryl sulfate, potassium lauryl sulfate, sodium myreth sulfate, sodium dodecyl sulfate, sodium laureth sulfate, sodium pareth sulfate, dioctyl sodium sulfosuccinate, perfluorobutanesulfonic acid, perfluorooctanesulfonic acid, perfluorononanoic acid, perfluorooctanoic acid, sodium palmate, sodium stearate, and sodium tallowate.

2. The method of claim 1, wherein the solution further contains an acid.

3. The method of claim 2, wherein the acid is $H_2SO_4$, $H_2Cr_2O_7$, $HMnO_4$, HBr, $HNO_3$, HCl, $HClO_3$, $HClO_4$, HI, $H_3PO_4$, p-toluenesulfonic acid, triflic acid, carborane superacid, or fluoroantimonic acid.

4. The method of claim 2, wherein the solution further contains a base.

5. The method of claim 4, wherein the base is KOH, NaOH, or LiOH.

6. The method of claim 1, wherein each of the first graphite-containing material and the second graphite-containing material, independently, is natural graphite flakes, artificial graphite, highly oriented pyrolytic graphite, polyacrylonitrile fiber-based graphite, or pitch-based graphite.

7. The method of claim 6, wherein each of the first graphite-containing material and the second graphite-containing material, independently, is natural graphite flakes, artificial graphite, or highly oriented pyrolytic graphite.

8. The method of claim 1, wherein the second electrode is a metal wire.

9. The method of claim 1, wherein the second electrode includes a second graphite-containing material.

10. The method of claim 1, wherein the alternating potential has alternating voltages in a waveform having an amplitude value of 0.1 to 250 V, and in a time span of 1 second to 1 week.

11. The method of claim 10, wherein the alternating voltages are in a wave form having an amplitude value of 2 to 250 V, and the time span is 1 second to 3 hours.

12. The method of claim 1, wherein the recovering step includes collecting the graphene sheets on a filter, and washing the graphene sheets on the filter.

13. The method of claim 1, after the recovering step, further comprising:
    drying the graphene sheets,
    redispersing the graphene sheets in an organic solvent to form a suspension,
    centrifuging at a pre-determined speed the suspension to obtain a supernatant containing the graphene sheets, and
    collecting the graphene sheets on a filter or by a reducing pressure concentration method.

14. The method of claim 13, further comprising heating the collected graphene sheets to remove any residual solvent.

* * * * *